(12) United States Patent
McIntosh et al.

(10) Patent No.: US 12,128,363 B2
(45) Date of Patent: Oct. 29, 2024

(54) ULTRA-VIOLET TREATMENT OF MEMBRANES AND RESULTING MEMBRANE

(71) Applicant: Solventum Intellectual Properties Company, Maplewood, MN (US)

(72) Inventors: Lucas D. McIntosh, Minneapolis, MN (US); Aniruddha A. Upadhye, St. Paul, MN (US); Joel A. Getschel, Osceola, WI (US)

(73) Assignee: Solventum Intellectual Properties Company, Maplewood, MN (US)

( * ) Notice: Subject to any disclaimer, the term of this patent is extended or adjusted under 35 U.S.C. 154(b) by 502 days.

(21) Appl. No.: 17/294,601

(22) PCT Filed: Nov. 21, 2019

(86) PCT No.: PCT/IB2019/060045
§ 371 (c)(1),
(2) Date: May 17, 2021

(87) PCT Pub. No.: WO2020/109943
PCT Pub. Date: Jun. 4, 2020

(65) Prior Publication Data
US 2021/0402354 A1    Dec. 30, 2021

Related U.S. Application Data

(60) Provisional application No. 62/772,710, filed on Nov. 29, 2018, provisional application No. 62/772,329, filed on Nov. 28, 2018.

(51) Int. Cl.
*B01D 67/00* (2006.01)
*B01D 69/02* (2006.01)
(Continued)

(52) U.S. Cl.
CPC ....... *B01D 67/009* (2013.01); *B01D 67/0079* (2013.01); *B01D 69/02* (2013.01);
(Continued)

(58) Field of Classification Search
CPC ...... B01D 67/009; B01D 69/02; B01D 69/06; B01D 71/68; B01D 2325/026;
(Continued)

(56) References Cited

U.S. PATENT DOCUMENTS 4,629,563 A   12/1986   Wrasidlo
4,976,859 A   12/1990   Wechs
(Continued)

FOREIGN PATENT DOCUMENTS

EP    2 939 731 A1    11/2015
JP    2014-042869     3/2014
(Continued)

OTHER PUBLICATIONS

Rupiasih, Study of Effects of Low Doses UV Radiation on Microporous Polysulfone Membranes in Sterilization Process, Open Journal of Organic Polymer Materials, 2013, 3, 12-18 (Year: 2013).*

(Continued)

*Primary Examiner* — Clare M Perrin

(57) ABSTRACT

A membrane having a first outer surface having a plurality of pores in a skin layer and the plurality of pores having a closed perimeter in the skin layer. The membrane having a second outer surface and a porous supporting layer connecting the first outer surface to the second outer surface. The first outer surface of the membrane is a melt-fused skin layer from exposure to ultra-violet light.

18 Claims, 8 Drawing Sheets

(51) Int. Cl.
*B01D 69/06* (2006.01)
*B01D 71/52* (2006.01)
*B01D 71/68* (2006.01)

(52) U.S. Cl.
CPC ........... *B01D 69/06* (2013.01); *B01D 71/522* (2022.08); *B01D 71/68* (2013.01); *B01D 2311/2619* (2013.01); *B01D 2323/345* (2013.01); *B01D 2325/0232* (2022.08); *B01D 2325/026* (2013.01); *B01D 2325/44* (2013.01)

(58) Field of Classification Search
CPC ................ B01D 67/0095; B01D 71/62; B01D 2325/022; B01D 2325/44
See application file for complete search history.

(56) References Cited

U.S. PATENT DOCUMENTS

| | | | |
|---|---|---|---|
| 5,629,084 | A | 5/1997 | Moya |
| 7,611,629 | B2 | 11/2009 | Doucoure |
| 7,942,274 | B2 | 5/2011 | Kools |
| 8,674,618 | B2 | 3/2014 | Shroder |
| 8,727,136 | B2 | 5/2014 | Ansorge |
| 9,844,625 | B2 | 12/2017 | Schneider |
| 2005/0247629 | A1 | 11/2005 | Doucoure |
| 2013/0193075 | A1 | 8/2013 | Liang |
| 2013/0256229 | A1* | 10/2013 | Wang ................. B01D 67/0018 428/315.9 |
| 2014/0039415 | A1 | 2/2014 | Schneider |
| 2015/0165388 | A1 | 6/2015 | Han |
| 2017/0341032 | A1* | 11/2017 | Zhou ...................... B01D 69/10 |
| 2018/0065105 | A1* | 3/2018 | Song ................. B01J 20/28035 |

FOREIGN PATENT DOCUMENTS

| | | | |
|---|---|---|---|
| JP | 2014042869 A | * 3/2014 | |
| WO | WO 2012-102678 | 8/2012 | |
| WO | WO 2017-209536 | 12/2017 | |
| WO | WO-2018169737 A1 | * 9/2018 | ......... B01D 67/0079 |

OTHER PUBLICATIONS

Yousif, Photodegradation and Photostabilization of Polymers, Especially Polystyrene: Review, SpringerPlus 2013, 2:398, Department of Chemistry, College of Science, Al-Nahrain University (Year: 2013).*

Kaeselev, Influence of the Surface Structure on the Filtration Performance of UV-Modified PES Membrane), Desalination 146 (2002) 265-271 (Year: 2002).*

Rivaton, Photodegradation of Polyethersulfone and Polysulfone, Polymer Degradation and Stability 66 (1999) 385-403 (Year: 1999).*

Tsujiwaki, JP2014042869A, English Machine Translation (Year: 2014).*

Kaeselev, et al., "Influence of the surface structure on the filtration performance of UV-modified PES membranes", Desalination 146, (2002), pp. 265-271.

Abdelrasoul, et al., "Morphology Control of Polysulfone Membranes in Filtration Processes: a Critial Review", ChemBioEng, 2015, 2, No. 1, pp. 22-44.

Yamagishi, Development of a novel photochemical technique for modifying poly (arylsulfone) ultrafiltration membranes , Journal of Membrane Science, 1995, vol. 105, pp. 237-247.

Fritzsche, "Hollow fiber membranes spun from lewis acid: Base complexes. I. structure determination by oxygen plasma ablation"., J. Appl. Polym. Sci, 1990, vol. 40, pp. 19-40.

International Search report for PCT International Application No. PCT/IB2019/060045 mailed on Feb. 27, 2020, 4 pages.

* cited by examiner

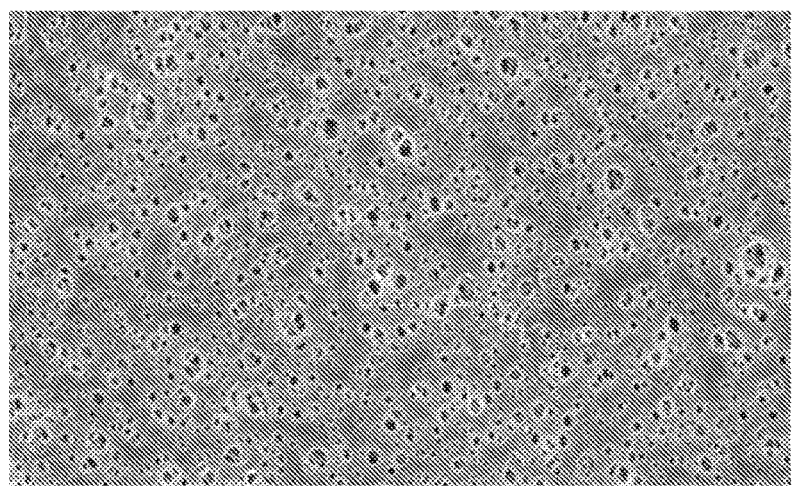
*Fig. 2*  5μm
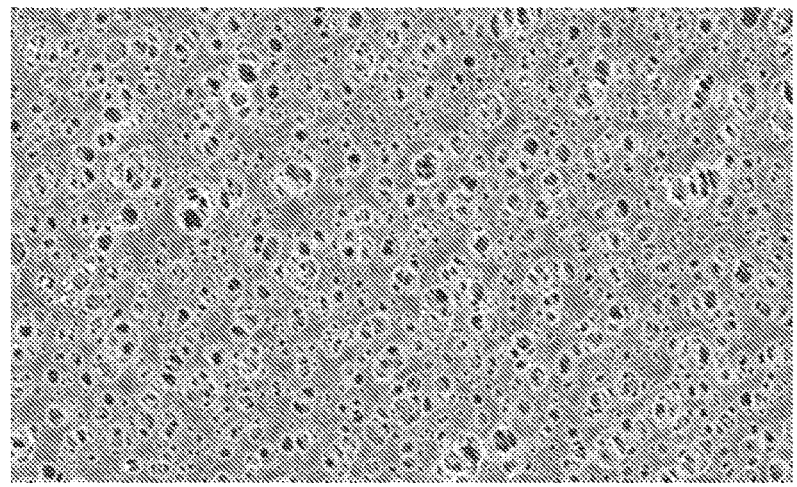
*Fig. 3*  5μm
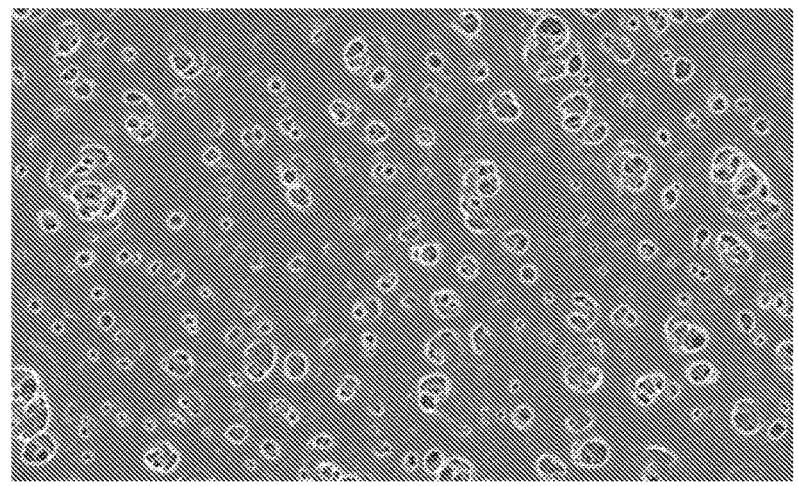
*Fig. 4*  5μm

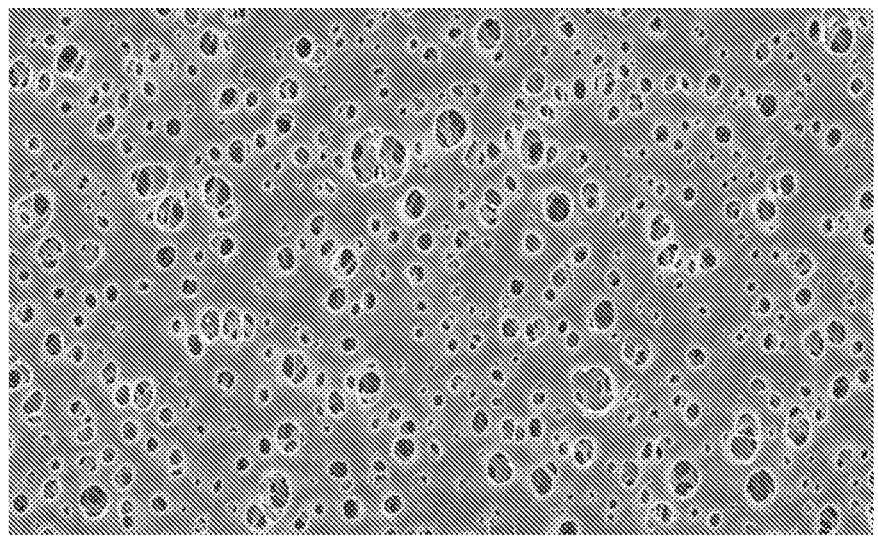
*Fig. 11*  5μm
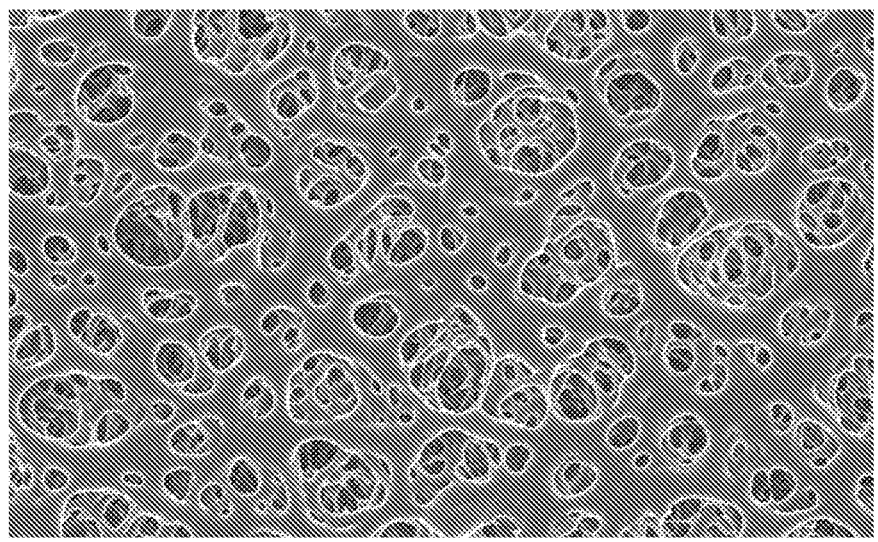
*Fig. 12*  5μm

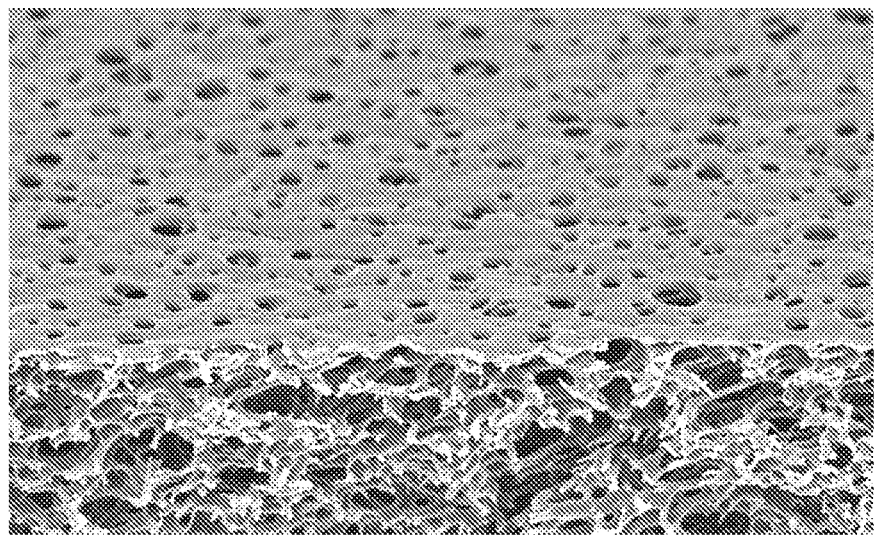
*Fig. 13*  5μm
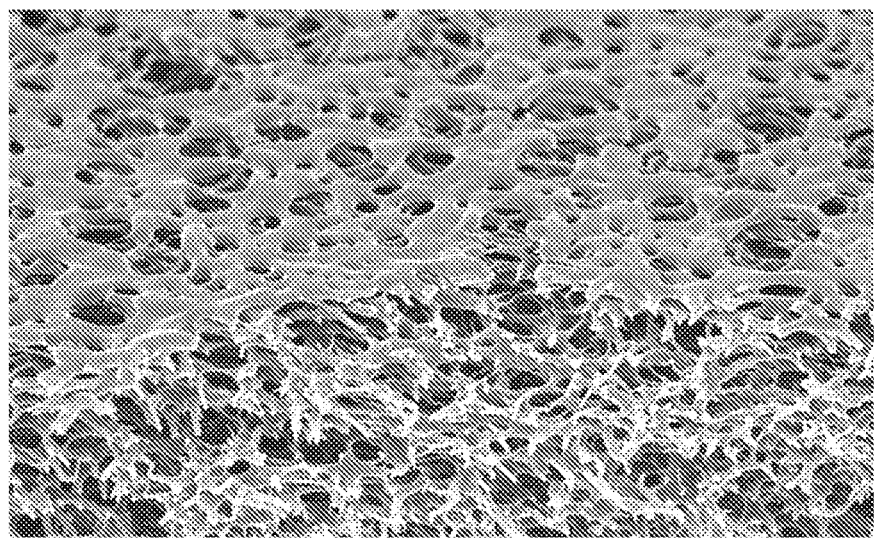
*Fig. 14*  5μm

ULTRA-VIOLET TREATMENT OF MEMBRANES AND RESULTING MEMBRANE

CROSS REFERENCE TO RELATED APPLICATIONS

This application is a national stage filing under 35 U.S.C. 371 of PCT/IB2019/060045, filed 21 Nov. 2019, which claims the benefit of U.S. Provisional Patent Application No. 62/772,710 filed 29 Nov. 2018, and U.S. Provisional Patent Application No. 62/772,329 filed 28 Nov. 2018, the disclosures of which are incorporated by reference in their entirety herein.

BACKGROUND

Membranes having a first outer surface with pores, an opposing second outer surface with pores, and a supporting layer with smaller pores disposed between the two surfaces with the supporting layer having a log reduction value of at least 7 are known such as the membrane disclosed in U.S. Pat. No. 8,727,136. These flat sheet membranes are sold under the MicroPES® trademark and available in 0.04 to 1.2 µm pore sizes and are useful for many different separation applications.

SUMMARY

The throughput of membranes is an important characteristic; especially, in membranes having small pores in the supporting layer used to remove bacteria from solutions. These nanoporous and microporous membranes can suffer from low throughput, especially if the pores in the outer two surfaces are relatively small. When manufacturing nanoporous or microporous polyethersulfone (PES) membranes using the solvent induced phase separation (SIPS) process, it is difficult to set up the machinery to make significantly larger pores on the surfaces while still retaining the micro or nano pore size in the supporting layer. Hence there is a need to increase the surface porosity of such membranes while retaining the existing pore size characteristics of the supporting or separating layer.

The inventors have determined that by using a high energy UV flashlamp that is directed to at least one outer surface layer, the pores in that outer surface layer can be significantly increased in size, resulting in a significant increase in the membrane's throughput. It is believed that the energy output of the flashlamp must be great enough to induce micro-melting of the outer surface layer such that in the UV irradiated surface layer, the pores increase in size and a melt-fused skin layer is formed. The melt-fused skin layer is thickened slightly due to a melting process and the appearance of such a layer is "melt-fused or molten" when looking at an SEM cross-section. However, if the energy output is too great, macro-melting can occur, in which the pores are blinded or fused shut by a much more dramatic redistribution of the molten material in the outer skin layer that seals up the outer pores thereby reducing throughput capacity.

Hence, in one aspect the invention resides in a membrane comprising a first outer surface having a plurality of pores in a skin layer; the plurality of pores having a closed perimeter in the skin layer; a second outer surface; a porous supporting layer connecting the first outer surface to the second outer surface; and wherein the first outer surface comprises a melt-fused skin layer from exposure to ultra-violet light.

In another aspect the invention resides a method of increasing the pore size in an outer surface of a membrane, the method comprising providing a membrane having a first outer surface having a plurality of pores in a skin layer; the plurality of pores having a closed perimeter in the skin layer; and the membrane having a second outer surface and a porous supporting layer connecting the first outer surface to the second outer surface; and exposing the first outer surface to ultra-violet light whereby the pores in the first surface are increased in size after exposure to the ultra-violet light.

BRIEF DESCRIPTION OF THE DRAWINGS

FIG. 2 shows a SEM view of the membrane's second outer surface of Comparative B (MicroPES® 1F PH) at 5,000×.

FIG. 3 shows a SEM view of the membrane's second outer surface of Example 5 (MicroPES® 1F PH) at 5,000×.

FIG. 4 shows a SEM view of the membrane's second outer surface of Comparative E (MicroPES® 1F PH) at 5,000×.

FIG. 11 shows a SEM view of the membrane's second outer surface of Comparative H (MicroPES® 2F) at 5,000×.

FIG. 12 shows a SEM view of the membrane's second outer surface of Example 8 (MicroPES® 2F) at 5,000×.

FIG. 13 shows a SEM view of the membrane's second outer surface and partial cross-section of Comparative H (MicroPES® 2F) at 5,000×.

FIG. 14 shows a SEM view of the membrane's second outer surface and partial cross-section of Example 8 (MicroPES® 2F) at 5,000×.

Figure 1:
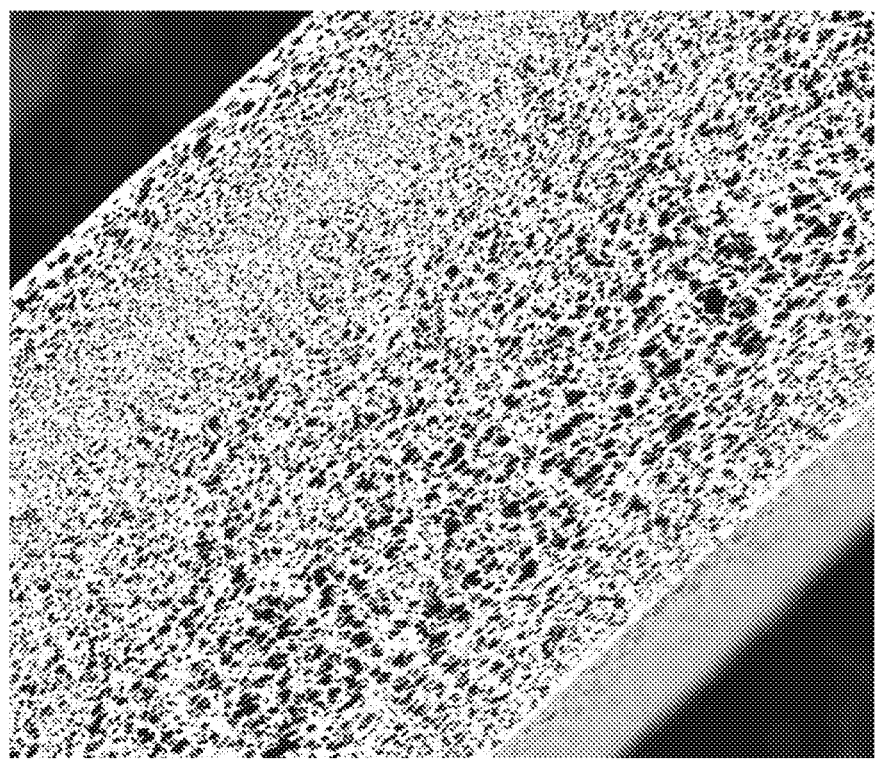
FIG. 1 shows a SEM cross-section of a flashlamp treated membrane (MicroPES® 2F) having a first opposing surface with a skin layer with pores, a second opposing surface with a skin layer with pores, and a supporting layer with smaller pores disposed between the first and the second surfaces.
Figure 5:
FIG. 5 shows a SEM view of the membrane's second outer surface and partial cross-section of Comparative B (MicroPES® 1F PH) at 5,000×.
Figure 6:
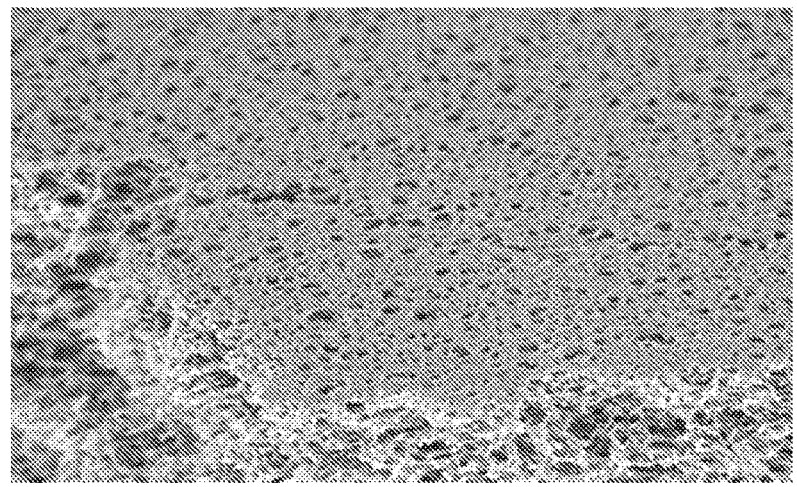
FIG. 6 shows a SEM view of the membrane's second outer surface and partial cross-section of Example 5 (MicroPES® 1F PH) at 5,000×.
Figure 7:
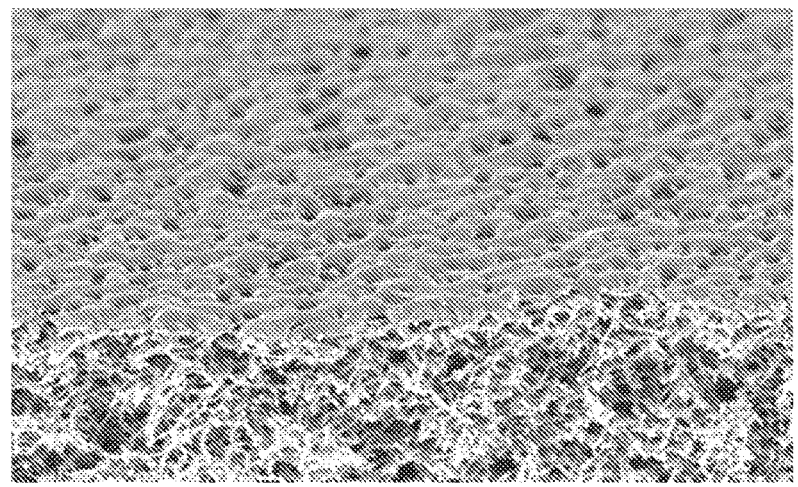
FIG. 7 shows a SEM view of the membrane's second outer surface and partial cross-section of Comparative E (MicroPES® 1F PH) at 5,000×.
Figure 8:
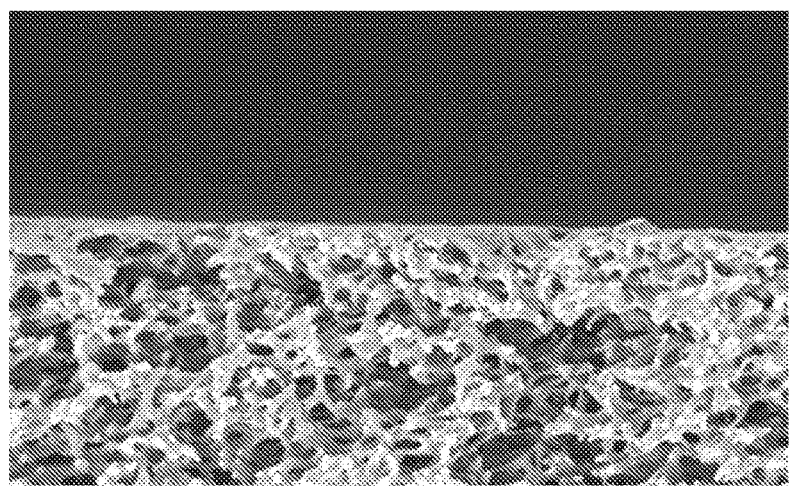
FIG. 8 shows a SEM view of a partial cross-section of Comparative B (MicroPES® 1F PH) at 15,000×.
Figure 9:
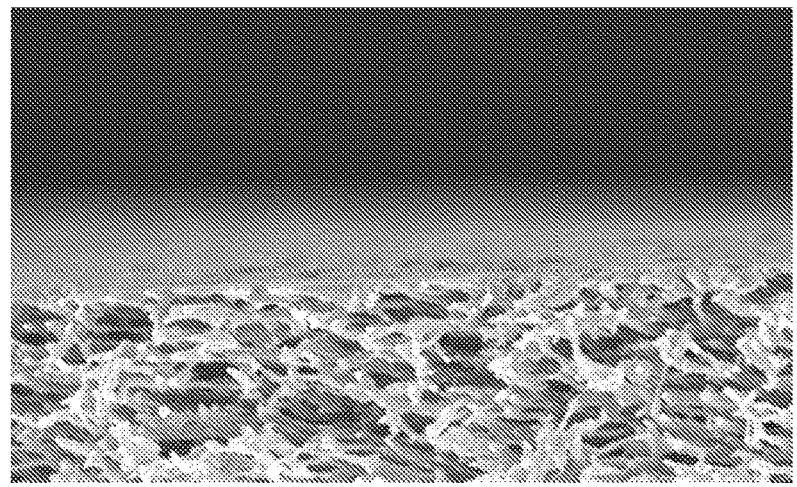
FIG. 9 shows a SEM view of a partial cross-section of Example 5 (MicroPES® 1F PH) at 15,000×.
Figure 10:
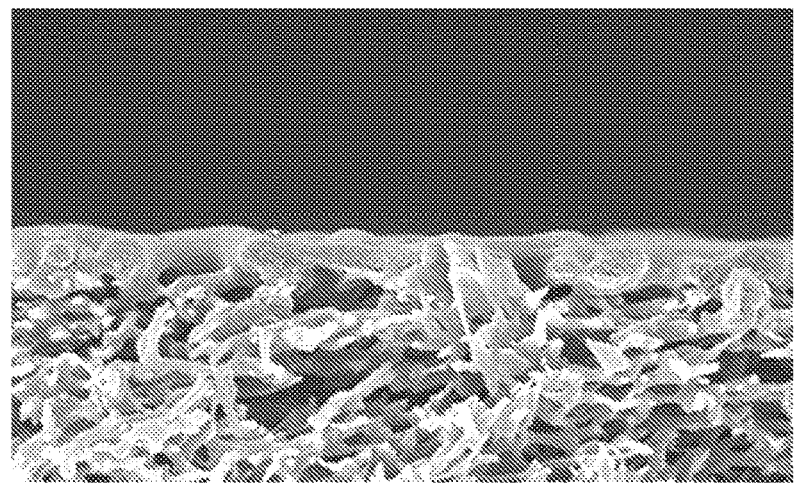
FIG. 10 shows a SEM view of a partial cross-section of Comparative E (MicroPES® 1F PH) at 15,000×.

Unless SEM photomicrographs, the various figures are not to scale.

DETAILED DESCRIPTION

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Flashlamp Treated Membrane

Referring now to FIG. 1, a flashlamp treated membrane is shown. The membrane has at least one first outer surface having a plurality of pores, and an opposing second outer surface that may also have a plurality of pores and a porous supporting layer connecting the first outer surface to the second outer surface. At least one of the surfaces has a micro-melted melt-fused skin layer from being subjected to the flashlamp treatment.

As best seen in FIG. 12, depicting Example 8, the pores are formed in a skin layer on the respective outer surface and have a closed perimeter in the plane of the skin layer. This means the pores are formed like islands in the surrounding skin, i.e. an island shape and surrounded by the non-porous skin layer. The pores or openings in the outer surfaces of the membrane and the skin surrounding them have an island-sea structure, wherein the pores ("islands") are arranged as a discontinuous phase in the skin surrounding them, which represents a continuous phase ("sea").

Figure 15:
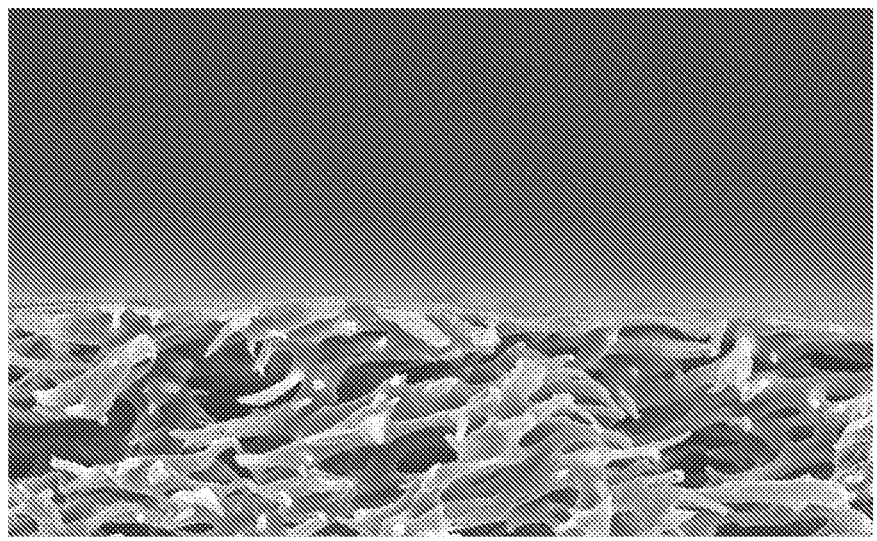
FIG. 15 shows a SEM view of a partial cross-section of Comparative H (MicroPES® 2F) at 15,000×.

Without wishing to be bound by theory, it is believed that the UV flashlamp irradiation process is especially effective with this type of porous structure. During the SIPS process, residual stresses may be present in the skin layer, such as hoop stresses around the closed perimeter of the pores in the skin layer. Once this skin layer is irradiated with sufficient energy to induce micro-melting, these residual stresses are relieved or eliminated when the material in this layer is sufficiently molten to redistribute itself. As such, the pores grow larger to relieve hoop stresses and a thicker closed perimeter or ridge is formed at the pore's closed perimeter during the material redistribution process. Compare FIGS. 11 and 15 no flashlamp treatment to FIGS. 12 and 16 with flashlamp treatment. As seen, the pores in the skin layer are enlarged (compare FIG. 11 to FIG. 12) and the thicker melt-fused skin layer that surrounds each pore is visible as part of the skin layer (compare FIG. 15 to FIG. 16). To observe this effect, the flashlamp needs to be a pulsed high energy UV source instead of a continuous exposure or constant value source. In case of exposure to a constant value UV source (e.g. germicidal bulbs), the membrane surface shows undesirable signs of cracking.

Alternatively, if the porous structure is made up of interstices between an entangled mass of fibers that are formed into a layer, no such increase in the size of the corresponding interstices is expected after treatment of this structure with the UV flashlamp irradiation process. Since the interstices are formed by the pattern of the overlapping fibers through the structure, subjecting the fibers to the UV flashlamp radiation may slightly alter the surfaces of the fibers with no effect on the size of the gap between them.

During a preferred UV flashlamp irradiation process, the outer surface of a PES membrane will be visually altered when both micro-melting and macro-melting is induced. As the absorbed UV flashlamp energy at the irradiated surface is increased, the PES will actually degrade slightly and these degradation species can be measured with time-of-flight secondary ion mass spectrometry TOF-SIMS. TOF-SIMS has monolayer sensitivity to atoms and molecules with an analysis depth in the range of 1 to 2 nm. At absorbed UV flashlamp energies that are too low to cause the micro-melting effect and a melt-fused skin layer, the PES irradiated membrane will remain visually the same having a white color and a glossy sheen even after exposure to the UV flashlamp radiation just like the original membrane. Degradation species are negligible or non-existent. At desirable absorbed UV flashlamp energies, the PES membrane will take on a yellow tint and a matte sheen indicative of micro-melting and a melt-fused skin layer. TOF-SIMS indicate that the flashlamp treatment increases the fraction of low molecular weight hydrocarbon and sulfur containing species in the irradiated membrane compared to an untreated membrane. These low molecular weight sulfur containing species are the likely cause of the yellow tint observed in the irradiated membranes. It was found that increasing the pulse overlap of the treatment increased the relative fraction of the low molecular weight species; however, no evidence of new chemistry was observed by the TOF-SIMS analysis. The intensity of the yellow color and the gloss lost is proportional to the increase in the absorbed energy by the irradiated skin layer. Desirable flashlamp energies appear to break down polyethersulfone chains as well as chains of the hydrophilic additive polyvinylpyrrolidone. Based on the comparison of TOF-SIMS data to Fourier transform infrared transmission microscopy (FTIR) data, the degradation species were only observed with the TOF-SIMS data indicating the effect from the absorbed UV flashlamp radiation was limited to the outermost layers of the membrane. Based on this data for this example, the effect on the membrane may be limited to a depth from the surface of 1000 nanometers or less such as 300 nanometers or less. As the absorbed UV flashlamp energy becomes too great, macro-melting occurs, a brown or black tint begins to emerge, and throughput capacity decreases from the untreated membrane because the pores become fused shut and are no longer open.

Using a broadband Xe flashlamp that is directed at the surface layer, the pore size in one or both outer surface layers can be significantly increased in size resulting in a significant increase in the membrane's throughput. It is believed that the energy output of the flashlamp must be great enough to induce micro-melting of the surface layer such that in the treated surface layer, the pores increase in size and a melt-fused skin layer is formed. The melt-fused skin layer is thickened slightly around the closed perimeter of the pore due to a melting process and the appearance of such a layer is "melt-fused or molten" when looking at an SEM cross-section as best seen comparing FIG. 15 to FIG. 16. However, if the energy output is too great, a macro-melting can occur in which the pores are blinded or fused shut by a much more dramatic redistribution of the molten material in the outer skin layer thereby reducing throughput capacity as best seen comparing FIGS. 2 and 4 to 8 and 10. Note how the number of pores in FIG. 4 after UV flashlamp irradiation is significantly less than the number of pores in FIG. 2 prior to exposure to the UV radiation.

It should be noted that in order for this micro-melting effect to be generated, it is believed that the membrane should be substantially free of liquids or other materials that could cool the membrane's surface and prevent the skin layer from melting due to the energy of the flashlamp. For example, if the membrane was wetted with a liquid such as water, that liquid would reside primarily in the pores of the membrane and act as a heat sink rapidly dissipating any thermal energy absorption of the skin layer from the UV light and thereby resulting in no changes in pore size. Alternatively, additives that are especially reactive to and that readily adsorb UV light could be added to the structure to enhance the effect.

The mean pore diameter, before or after flashlamp treatment, in the first surface can be from about 0.001 to about 100 μm in size, or about 0.01 to about 10 μm, or about 0.1 to about 1 μm. The surface porosity, before or after flashlamp treatment, in the first surface can be from about 1 to about 75%, or about 5 to 50%, or from about 10 to 25%. The mean pore diameter, before or after flashlamp treatment, in the second surface can be about 0.001 to about 100 μm in size, or about 0.01 to about 10 μm, or about 0.1 to about 1 μm. The surface porosity, before or after flashlamp treatment, in the second surface can be from about 1 to about 75%, or about 5 to 50%, or from about 10 to 25%. The average pore size in the first surface can be larger than, equal to or smaller than the average size of the pores in the second surface. The density of the pores in the first surface can be larger than, equal to, or smaller than the density of the pores in the second surface.

Figure 16:
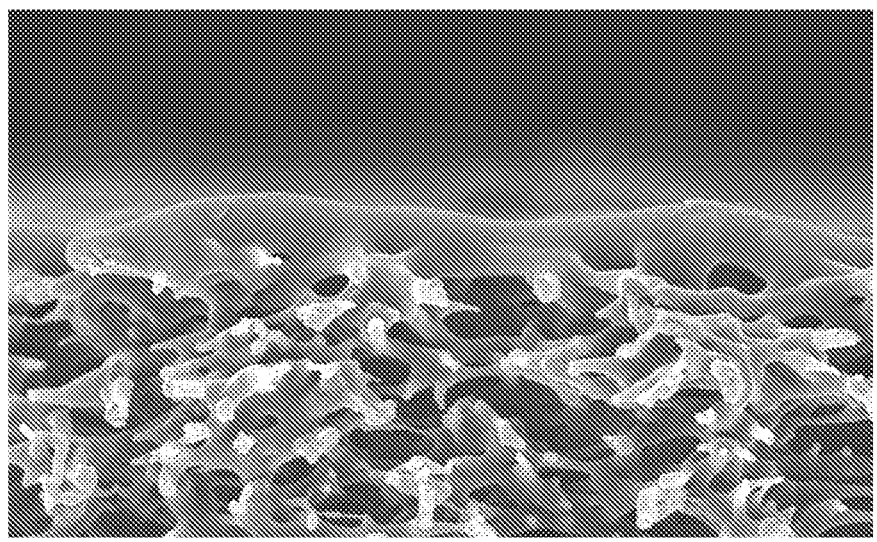
FIG. 16 shows a SEM view of a partial cross-section of Example 8 (MicroPES® 2F) at 15,000×.

The supporting layer is relatively unaffected by the flashlamp treatment, which extends only a few hundred nanometers into the bulk of the membrane as best seen in FIG. 16. The supporting layer in one embodiment is a three-dimensional sponge-like network having a significant length between the opposing outer surfaces such that the membrane can act as a depth filter. At least some of the pores in the supporting layer are smaller in size than the pores in either the first or the second surface. The pores in the supporting layer can be uniform in size from the first surface to the second surface or they may vary in size having a gradient from larger pores to smaller pores. The supporting layer may include a separating layer having the smallest pore size of all and the overall porosity through the supporting layer can resemble an hour glass with the smallest pores located in the separating layer. The porosity of the supporting layer can be symmetric or asymmetric about the separating layer.

In various embodiments of the invention, the melt-fused skin layer formed by the absorbed UV radiation extends for a depth less than or equal to 1000 nanometers, 500 nanometers, 350, nanometers 250 nanometers, 100 nanometers, 50 nanometers, 25 nanometers, 15 nanometers, or 10 nanometers but greater than 0 nanometers, such as greater than 5, 10, 20, 30, 40, or 50 nanometers. Ranges between these maximum and minimum amounts are within the scope of the invention such as between 10 and 500 nanometers by way of a non-limiting example.

As seen in the Examples, when the applied UV energy and corresponding absorbed UV flashlamp radiation is between certain limits, the overall membrane throughput capacity is significantly increased. When the energy is too low, no change in throughput capacity is noted. When the energy is too high, the throughput capacity is actually decreased and the membrane performs worse. In various embodiments of the invention the throughput capacity can be greater than 50 grams, or 100 grams but less than 2000 grams such as between about 50 to about 1000 grams, or about 100 to about 1000 grams, or about 150 to about 1000 grams. In various embodiments of the invention, the percent increase in throughput capacity can be between about 15 to about 500 percent, or about 30 to about 250 percent, or about 40 to about 150 percent.

For certain applications where sterilizing performance is required, the membrane should have a log reduction value of at least 7 after the flashlamp treatment process. Because the bulk of the membrane is relatively unaffected by the absorbed UV flashlamp radiation and only the skin layer is typically changed, the log reduction value of the membrane typically remains unchanged. In various embodiments of the invention, the log reduction value of the membrane can be greater than or equal to 7, 8, 9, or 10. In general, for the same sterilizing capacity a higher throughput capacity is preferred.

While the invention has focused on membranes having a log reduction value of at least 7, the invention is not so limited. Any membrane having at least one skin layer with a plurality of pores having a closed perimeter or circumference in the outer skin layer is a candidate for treatment; especially if the membrane is a depth filter and the goal is to prevent blinding or the formation of a "cake filter" on the skin layer.

Useful materials for making the membrane include polymers that are highly absorptive of radiation in the UV-C range (from about 100 nm to about 289 nm). Suitable polymers include poly (arylene ethers) such as, for example, polyethylene terephthalate (PET), polyethylene naphthalate (PEN), polyethersulfone, and polysulfone. Membranes made of polypropylene and polyvinylidene fluoride were irradiated with UV flashlamp and found to exhibit no change in performance after surface irradiation with UV flashlamp. Suitable methods for making the membrane include solvent induced phase separation, thermally induced phase separation, and vapor induced phase separation amongst others.

Suitable membranes for use with the flashlamp process include any membrane with surface pores having a closed perimeter. Typically, the pore will be located in a skin layer. Suitable membranes are described in U.S. Pat. No. 4,629, 563 and membranes with a skin layer available from Millipore Corporation; U.S. Pat. Nos. 4,976,859; 8,727,136; US 2014/0039415, U.S. Pat. No. 9,844,625; US2013/0193075 and membranes sold under the SUPOR tradename available from Pall Corporation.

Figure 17:
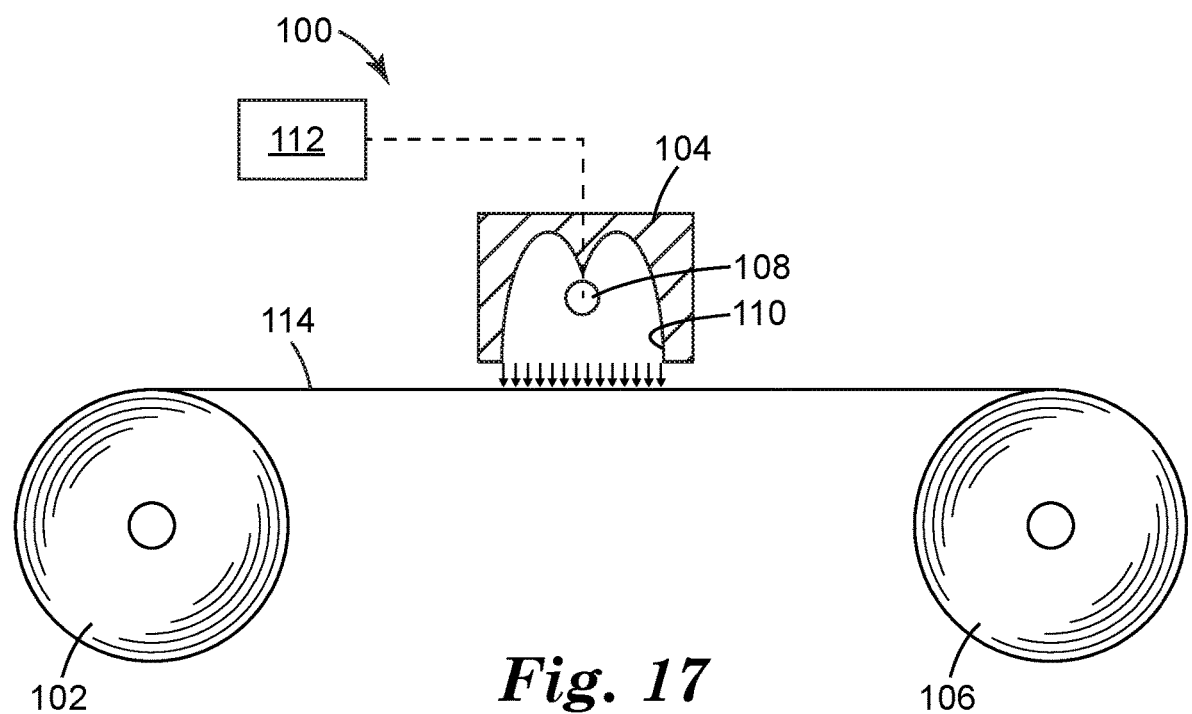
FIG. 17 is an apparatus for the flashlamp treatment of membranes.

FIG. 17 shows a typical flashlamp treatment process 100 including an unwind 102, a flashlamp treatment station 104, and a rewind 106.

The flashlamp treatment station 104 includes a xenon bulb 108, a reflector 110, and a pulse-modulated controller 112 to power the bulb. In one embodiment, the flashlamp treatment station provided a pulsed, broadband light from the xenon bulb onto the outer surface of the membrane 114.

The flashlamp treatment station uses high energy capacitors and a pulse forming network to generate short-pulse broadband light. The flashlamp used has a pulse duration of about 5 µs. It is preferred that the pulse width is less than 100 µs. In the case of a pulsed system, the instantaneous energy deposited on the surface can be orders of magnitude higher compared with a constant value source of similar average power. The high instantaneous energy deposition can results in micro-melting of the surface generating the melt-fused layer. With pulse duration of less than 100 µs, between the two pulses of the flashlamp, the membrane surface is cooled conductively by the bulk of the membrane. This reduces the likelihood of cracking which is seen in constant UV source radiation, as the thermal stresses are relieved by this cooling phenomenon. In various embodiments, the pulse duration can be at least 1, 2, 3, 4, 5, 6, 7, 8, 9, 10, 20, 30, 40, 50, or 75 µs but less than 100 us. The xenon lamp has a xenon pressure of 200 mTorr and is manufactured by Applied Photo Technology. The light output of the xenon lamp is between about 200 to 500 nanometers with a maximum output near 240 nanometers. A membrane having a PES outer surface can readily absorb wavelengths in this range having an absorption spectrum from about 230 to about 350 nanometers with a peak absorption occurring at about 250 nanometers.

The energy delivered to the membrane's surface by the flashlamp can be controlled by several variables including: voltage to the lamp, pulse overlap, and the distance to the membrane. In general, sufficient energy must be delivered to the outer surface of the membrane to enable micro-melting and pore enlarging of just the surface layer without macro-melting the surface layer and fusing the pores closed. The pulse overlap is calculated based on web speed, and the lamp frequency using the following formula:

$$\text{Pulse Overlap } (X) = \frac{\text{Treatment width (m)} \times \text{Pulse frequency (Hz)}}{\text{web speed}\left(\frac{m}{s}\right)}$$

For a PES membrane, absorbed energies by PES film from about 45 to 440 mJ/cm$^2$, or about 100 to about 300 mJ/cm$^2$, or from about 125 to about 250 mJ/cm$^2$ have been found satisfactory. Surface energies less than 44 mJ/cm$^2$ are often insufficient to induce micro-melting and the surface porosity and throughput of the PES membrane are unchanged after treatment. Surface energies greater than 440 mJ/cm$^2$ can induce macro-melting reducing the surface porosity and throughput of the PES membrane.

Measurement of Energy Absorbed by PES Film

The xenon bulb emits broadband radiation over a wide spectrum in the flashlamp process. For flashlamp treatment to be effective, the substrate must absorb the energy emitted by the bulb. To quantify amount of energy absorbed by PES membrane, a clear PES film (available from Goodfellow Corporation, Coraopolis, Pa., USA) was used. First, the total energy output was measured using a laser power energy meter (available under the trade designation "COHERENT 3 SIGMA" from Coherent, Santa Clara, Calif., USA) with a 1-inch diameter detector. Then, the clear PES film was placed on the detector and the energy transmitted through the PES film was measured. The amount of energy absorbed by the PES film was estimated from the difference between total energy and the energy transmitted through the PES film.

EXAMPLES

Materials

The materials with their sources are listed in Table 1. Unless otherwise indicated, all materials were purchased from commercial sources and used as received.

TABLE 1

Materials List

| Trade Designation | Description | Supplier |
|---|---|---|
| MicroPES ® 1F PH | Flat sheet microfiltration polyethersulfone (PES) membrane having a pore size of 0.04 micrometers | 3M Germany |
| MicroPES ® 2F | Flat sheet microfiltration polyethersulfone (PES) membrane having a pore size of 0.2 micrometers and thickness of about 100 micrometers. | 3M Germany |
| MicroPES ® 2F PH | Flat sheet microfiltration polyethersulfone (PES) membrane having a pore size of 0.2 micrometers | 3M Germany |
| MicroPES ® 4F | Flat sheet microfiltration polyethersulfone (PES) membrane having a pore size of 0.4 micrometers | 3M Germany |
| MicroPES ® 6F | Flat sheet microfiltration polyethersulfone (PES) membrane having a pore size of 0.6 micrometers | 3M Germany |
| MicroPES ® 8F | Flat sheet microfiltration polyethersulfone (PES) membrane having a pore size of 0.8 micrometers | 3M Germany |
| 3M Flat Membrane PP Series, Type 2E HF | Flat sheet microfiltration polypropylene (PP) membrane having a pore size of 0.2 micrometers | 3M Germany |

EXPERIMENTAL METHODS

Throughput Capacity

Throughput capacity was tested according to the following procedure. A 40-ppm aqueous solution of freeze-dried soluble coffee (available under the trade designation "NESCAFE GOLD BLEND" from Nestle USA, Glendale, Calif., USA) was prepared in deionized water at room temperature. Other suitable freeze-dried coffees can be substituted to make the dilute colloidal dispersion if the NESCAFE GOLD BLEND is unavailable. Exemplary and comparative membranes prepared as described below were cut to produce 47-mm diameter circular discs. The coffee solution was filtered through the discs at an applied pressure of 0.4 bar. In the Examples, the flashlamp-treated side of the membrane was oriented to be the feed side. Throughput capacity is expressed as the mass of filtrate weighed after 10 minutes of filtration.

Microbe Retention

The method for determining the retention capacity is based on DIN 58355, Part 3, November 1990 and HIMA regulation no. 3, Vol. 4, 1982 (Health Industry Manufacturers Association) tested whether flat membranes with a nominal pore size of 0.2, 0.4, or 0.6 µm against the corresponding test organisms *Brevundimonas diminuta* (origin: ATCC 19146), *Serratia marcescens* (ATCC 14756), or *Saccharomyces cerevisiae* (ATCC 9763) are tight.

The test organism *Brevundimonas diminuta* (DSM German Collection of Microorganisms and Cell Cultures No. 1635, source: ATCC 19146. Size: diameter=0.3-0.4 µm; length=0.6-1.0 µm) was used to challenge MicroPES 2F and MicroPES 2F PH (each with a pore rating of 0.2 µm) membrane samples in compliance with DIN 58355, Part 3, November 1990 and the HIMA Regulation No. 3, Vol. 4, 1982 (Health Industry Manufacturers Association).

The test organism *Serratia marcescens* (DSMZ-German Collection of Microorganisms and Cell Cultures No. 1636, origin: ATCC 14756. Size: diameter=0.5-0.8 µm; length=0.9-2.0 µm) was used to challenge MicroPES 4F (pore rating of 0.4 µm) membrane samples in compliance with DIN 58355, Part 3, November 1990 and the HIMA Regulation No. 3, Vol. 4, 1982 (Health Industry Manufacturers Association).

The test organism *Saccharomyces cerevisiae* (DSMZ-German Collection of Microorganisms and Cell Cultures No. 1333, origin: ATCC 9763. Size 3×5 µm) was used to challenge MicroPES 6F (pore rating of 0.6 µm) membrane samples in compliance with DIN 58355, Part 3, November 1990 and the HIMA Regulation No. 3, Vol. 4, 1982 (Health Industry Manufacturers Association).

Filter discs with a diameter of 142 mm were cut out from the membrane material with a round cutting tool. The membrane sample was then placed in glass petri dish with distilled water with their upstream side (roll side=inside of the roll) facing upwards and autoclaved at a minimum of 121° C. for at least 20 minutes for sterilization.

The filter holder (142 mm) was loosely screwed together, packed in aluminum foil and autoclaved at a minimum of 121° C. for at least 30 minutes. The previously sterilized flat membrane sample is inserted in the cooled filter holder under sterile conditions (safety cabinet) with its upstream side facing upwards after autoclaving. Then, the filter holder is tightly screwed and positioned in the test stand for the retention test.

The culture media (Casein peptone soybean flour peptone broth (CSB), Saline lactose broth (SLB)) were prepared in accordance with the instructions of the manufacturer. The main culture was diluted with sterile distilled water to yield a bacteria concentration of approximately $2\times10^6$ to $10^7$ CFU/mL (CFU=colony forming unit). The pressure containers were filled with sterile water and the test bacteria suspension and pressurized to 2.0±0.2 bar.

First, 500 mL of sterile water were filtered through the flat membrane (negative control). The water was collected in a sterile container. The time required for the sterile water filtration was measured and recorded. Afterwards the flat membrane was applied to the test bacteria suspension after changing the sterile collecting container and the pressure hose at the filter holder. The time was measured and the volume in milliliters was recorded. The targeted filtration volume was 1000 mL. Afterwards, the analytical sterile filtration was carried out under the sterile bench. The sterile disposable filtration units (0.2 µm) were placed on the suction system and the filtrates of the sterile water and the test bacteria suspension were fully filtered through a filter under vacuum. The analysis filters were subsequently removed with sterile tweezers, placed on agar plates free of air bubbles and incubated in the incubator at 30° C. for 7 days.

Approximately 1 mL of the test bacteria suspension from the pressure container was filled in a sterile test tube after completing the bacteria retention test to determine the initial bacteria count. Serial dilution with sterile water is carried out using this suspension.

The incubated agar plates were evaluated by means of counting the bacteria colonies after the incubation period to determine the initial bacteria count. The ability of the filter to retain bacteria is reported as log reduction value (LRV). The LRV is the base-10 logarithm of the initial number of bacteria in the suspension and the number of bacteria in the filtrate (HIMA Document No. 3, Vol. 4, 1982). If no bacteria are detected in the filtrate, the value of the divisor equals 1.

$$LRV = \log_{10} \frac{CFU_{initial} \times V_{filtered}}{CFU_{filtrate}}$$

Example

Initial bacteria count: $1.7\times10^7$ CFU/mL

Bacteria count in the filtrate: 0 CFU

Filtered volume: 1000 mL $$LRV = \log_{10} \frac{1.7 \times 10^7 \; CFU \times 1000 \; mL}{1 \; CFU} = \log_{10} 1.7^{10} => 10 \; LRV$$

The tested flat membrane meets the requirements if, with minimum initial bacteria count of $1\times10^7$ CFU/cm² of the membrane area, neither the test organism nor foreign contamination could be detected in the filtrate of three samples. The retention capacity (as LRV) then meets the HIMA Regulation (Health Industry Manufacturers Association).

The test must be repeated if the test organism was detected in one of three samples.

Surface Porosity

The surface porosity was quantified by the following procedure. The membrane was sputter-coated with gold prior to imaging via scanning electron microscope (SEM; available under the trade designation "QUANTA 250 MK2" from FEI, Hillsboro, Oreg., USA). The second outer surface of COMP. EXAMPLE H and EXAMPLE 8 were imaged at 8,000× magnification with high black/white contrast using a back-scattered electron detector. The membrane surface porosity and mean pore diameter are calculated with image analysis software (available under the trade designation "SCANDIUM" from ResAlta, Golden, Colo., USA). Other suitable image analysis techniques known to those of skill in the art can be used to measure the surface porosity and the average pore size if needed.

Low Molecular Weight Hydrocarbon and Sulfur-Containing Compounds

Measurement of compounds resulting from degradation of the membrane material was conducted using a time-of-flight secondary ion mass spectrometry (TOF-SIMS) (mass spectrometer model PHI nanoTOF II, commercially available from Physical Electronics, Chanhassen, Minn., USA), and instrument parameters shown in Table A, below.

TABLE A

| | | SIMS Instrument Parameters | | | |
|---|---|---|---|---|---|
| Instrument | Mode | Primary Ion Beam | Primary Ion Beam Size | Secondary Ion Polarity | Analysis Area |
| PHI nanoTOF II | Spectrum (high mass resolution) | 30 keV $Bi_3^{++}$ | ~1 μm | +/− | 200 μm × 200 μm |
| | Imaging (high spatial resolution) | 30 keV $Bi_3^{++}$ | ~0.2 μm | +/− | 200 μm × 200 μm |
| | Depth Profiling | 20 keV $Ar_{2500}^+$ (sputter beam) | ~50 μm | NA | 600 μm × 600 μm |
| | | 30 keV $Bi_3^{++}$ (analysis beam) | ~1 μm | +/− | 200 μm × 200 μm |

Comparative Examples A-E and Examples 1-5

Comparative Examples A-E and Examples 1-5 were prepared using a commercially available PES membrane (MICROPES 1F PH available from 3M Germany) supplied in roll form. The side of the membrane that is visible and was exposed to air in the wound roll format is hereinafter referred to as first outer surface. The side of the membrane that faces and was in contact with the core is hereinafter referred to as second outer surface.

For Comparative Examples A-B, the membranes were not treated and were tested as received. For Examples 1-5 and Comparative Examples C-E, either the first outer surface or the second outer surface of the membrane was subjected to pulsed ultraviolet (UV) light using a flashlamp system. The flashlamp system included a xenon lamp with a xenon pressure of 200 mTorr (Model XP 456, commercially available from Applied Photon Technology, Hayward, Calif., USA) emitting broadband light between wavelengths of 200 and 500 nm, with a maximum output near 240 nm. The flashlamp system had a pulse FWHM (full width at half max) of 4.6 μs, and peak power of approximately 30 MW. Flashlamp conditions (voltage used and pulse overlap) are listed in Table 2, below.

A summary of Comparative Examples A-E and Examples 1-5 is in Table 2, below.

TABLE 2

| Comparative Exa A-E and Examples 1-5 | | | | |
|---|---|---|---|---|
| EXAMPLES | TREATED/TESTED SURFACE | VOLTAGE (kV) | PULSE OVERLAP | ENERGY ABSORBED BY PES FILM (mJ/cm$^2$) |
| Comp. Example A | First outer surface | 0 | 0 | 0 |
| Comp. Example B | Second outer surface | 0 | 0 | 0 |
| Comp. Example C | First outer surface | 8 | 2.0× | 15.8 |
| Comp. Example D | First outer surface | 16 | 2.0× | 88.0 |
| Comp. Example E | Second outer surface | 24 | 5.0× | 176.4 |
| Example 1 | First outer surface | 18 | 2.0× | 115.3 |
| Example 2 | First outer surface | 20 | 2.0× | 143.3 |
| Example 3 | First outer surface | 22 | 2.0× | 170.5 |
| Example 4 | First outer surface | 24 | 2.0× | 176.4 |
| Example 5 | Second outer surface | 16 | 2.0× | 88.0 |

Comparative Examples F-M and Examples 6-11

Comparative Examples F-M and Examples 6-11 were prepared generally following the procedure described above for Comparative Examples A-E and Example 1-5, except that the commercially available membranes and treatment conditions differed. Table 3, below, summarizes the membranes and treatment conditions used in Comparative Examples F-M and Example 6-11. The membranes tested are commercially available from 3M Germany.

TABLE 3

Comparative Examples F-M and Examples 6-11

| EXAMPLES | MEMBRANE | TREATED/TESTED SURFACE | VOLTAGE (kV) | PULSE OVERLAP | ENERGY ABSORBED BY PES FILM (mJ/cm$^2$) |
|---|---|---|---|---|---|
| Comp. Ex. F | MicroPES ® 2F PH | First outer surface | 0 | 0 | 0 |
| Example 6 | 2F PH | surface | 24 | 2.0× | 176.4 |
| Comp. Ex. G | MicroPES ® 2F PH | Second outer surface | 0 | 0 | 0 |
| Example 7 | 2F PH | surface | 18 | 2.0× | 115.3 |
| Comp. Ex. H | MicroPES ® 2F | Second outer surface | 0 | 0 | 0 |
| Example 8 | 2F | surface | 24 | 2.0× | 176.4 |
| Comp. Ex. I | MicroPES ® 4F | Second outer surface | 0 | 0 | 0 |
| Example 9 | 4F | surface | 24 | 2.0× | 176.4 |
| Comp. Ex. J | MicroPES ® 6F | Second outer surface | 0 | 0 | 0 |
| Example 10 | 6F | surface | 24 | 2.0× | 176.4 |
| Comp. Ex. K | MicroPES ® 8F | Second outer surface | 0 | 0 | 0 |
| Example 11 | 8F | surface | 24 | 2.0× | 176.4 |
| Comp. Ex. L | 3M Flat Membrane PP Series, Type 2E HF | First outer surface | 0 | 0 | 0 |
| Comp. Ex. M | | | 24 | 2.0× | 176.4 |

Throughput capacity and microbe retention of the membranes of Comparative Examples A-M and Examples 1-11 were measured using the procedure described above. Results are shown in Table 4, below, in grams (mean measurement) and in percent change of the mean measurement of throughput capacity relative to the mean measurement of throughput capacity of their respective comparative (i.e., untreated membrane) examples.

TABLE 4

Throughput capacity of Comparative Examples A-M and Examples 1-11

| EXAMPLES | THROUGHPUT CAPACITY Mean (g) | Change relative to control (%) | MICROBE RETENTION Log reduction value (LRV) |
|---|---|---|---|
| Comp. Example A | 149 | N/A | ≥7 |
| Comp. Example B | 278 | N/A | ≥7 |
| Comp. Example C | 156 | 4.8% | Not tested |
| Comp. Example D | 156 | 4.8% | Not tested |
| Comp. Example E | 80.5 | −71.0% | Not tested |
| Example 1 | 211 | 41.7% | Not tested |
| Example 2 | 251 | 68.3% | Not tested |
| Example 3 | 276 | 85.1% | Not tested |
| Example 4 | 295 | 98.0% | Not tested |
| Example 5 | 347 | 25.0% | Not tested |
| Comp. Example F | 132 | N/A | ≥7 |
| Example 6 | 263 | 98.8% | ≥10.3 |
| Comp. Example G | 204 | N/A | ≥7 |
| Example 7 | 295 | 44.5% | ≥10.3 |
| Comp. Example H | 188 | N/A | ≥7 |
| Example 8 | 396 | 110% | ≥10.3 |
| Comp. Example I | 286 | N/A | ≥7 |
| Example 9 | 460 | 60.9% | ≥10.8 |
| Comp. Example J | 283 | N/A | ≥7 |
| Example 10 | 526 | 85.9% | ≥9.4 |
| Comp. Example K | 365 | N/A | Not tested |
| Example 11 | 776 | 113% | Not tested |
| Comp. Example L | 596 | N/A | Not tested |
| Comp. Example M | 494 | −17.1% | Not tested |

Surface porosity and mean pore diameter of membranes of Example 10 and Comparative Example F were measured according to the procedure described above. Results are reported in Table 5, below. The pores increased in diameter by 45 percent and the surface porosity increased by 90 percent. In various embodiments of the invention, the increase in pore diameter can be between about 10 percent to about 100 percent, or between about 25 percent to about 75 percent, or between about 35 percent to about 55 percent. In various embodiments of the invention, the increase in surface porosity can be between about 20 to about 200 percent, or between about 50 to 150 percent, or between about 75 to 125 percent.

TABLE 5

Surface Porosity and Mean Pore Diameter

| EXAMPLES | SURFACE POROSITY (%) | MEAN PORE DIAMETER (microns) |
| --- | --- | --- |
| Comp. Example H | 9.79 | 0.30 |
| Example 8 | 18.6 | 0.44 |

Low molecular weight hydrocarbon and sulfur-containing species were measured for membranes of Comparative Example H and Example 8, using the procedure described above. Results indicate that the flashlamp treatment (Example 8) increases the fraction of low molecular weight hydrocarbon and sulfur-containing species relative to an untreated sample (Comparative Example H). Without wishing to be bound by theory, it is believed that these low molecular weight sulfur-containing species cause a yellow color of flashlamp-treated samples. Increasing the energy density, increases the relative fraction of low molecular weight species, although it is important to note that no evidence of new chemistry was observed with TOF-SIMS. In general, the flashlamp treatment appears to break down polyethersulfone chains, as well as chains of the hydrophilic additive polyvinylpyrrolidone (PVP).

The decreasing fraction of PVP relative to high molecular weight PES was quantified by taking the ratio of four different characteristic PVP ions relative to C7H7+, an ion indicative of PES. Four ions indicative of PVP exhibit a statistically significant decrease relative to PES as shown in Table 6.

TABLE 6

Ratio of Four Different PVP-indicative Ions to the PES-indicative Ion C7H7+

| EXAMPLES | C5H8NO+ | C6H10NO+ | C7H10NO+ | C8H12NO+ |
| --- | --- | --- | --- | --- |
| Comp. Example H | 1.591 | 2.344 | 1.723 | 2.415 |
| Example 8 | 0.922 | 1.305 | 0.786 | 0.997 |

As shown in the Examples and Comparative Examples described above, a total absorbed energy by PES film of at least 44 mJ/cm$^2$ is necessary to induce micro-melting of the surface of the membrane. Conversely, energies higher than about 440 mJ/cm$^2$ absorbed by PES film lead to macro-melting of the surface of the membrane, resulting in reduced throughput.

Micro-melting of the surface of the membrane occurs when the membrane includes a polymer absorptive of radiation in the ultraviolet-C spectrum (from about 100 nm to about 289 nm), such as, for example, polyethersulfone. In contrast, polyolefins such as polypropylene, do not generally absorb radiation in UV-C wavelengths, and as a result, micro-melting of the surface of the membrane does not occur.

Treated membranes according to the present application have increased surface porosity and increased mean pore diameters when compared to similar untreated membranes. These two features provide increased throughput while maintaining microbe retention.

Those having skill in the art will appreciate that many changes may be made to the details of the above-described embodiments and implementations without departing from the underlying principles thereof. The scope of the present disclosure should, therefore, be determined only by the following claims.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A membrane comprising:
    a first outer surface having a plurality of pores in a skin layer;
    the plurality of pores having a closed perimeter in the skin layer;
    a second outer surface;
    a porous supporting layer connecting the first outer surface to the second outer surface; and
    wherein the first outer surface comprises a melt-fused skin layer from exposure to ultra-violet light;
    wherein the melt-fused skin layer has a depth and the depth extends for 500 nanometers or less; and
    wherein the membrane has a throughput capacity expressed as a mass of filtrate weighed after 10 minutes of filtration, and wherein the throughput capacity is between about 100 to 1000 grams.

2. The membrane of claim 1, wherein the second outer surface has a plurality of pores having a closed perimeter, and wherein the second outer surface comprises a skin layer.

3. The membrane of claims 1 or 2, wherein the membrane has a log reduction value greater than or equal to 7.

4. The membrane of claims 1, 2, or 3, wherein the membrane's first outer surface is made from a poly (arylene ether) such as polyethylene terephthalate, polyethylene naphthalate, polyethersulfone, or polysulfone.

5. The membrane of claim 4, wherein the first outer surface has a yellow tint.

6. The membrane of claim 4, wherein the first outer surface has a matte sheen.

7. The membrane of claim 4, wherein a time-of-flight secondary mass spectrometry (TOF-SIMS) analysis of the first outer surface shows degradation species comprising sulfur.

8. The membrane of claims 1, 2, or 3, wherein the supporting layer comprises a three-dimensional sponge-like network having a separating layer with a plurality of pores and the pores in the separating layer are smaller than the pores in the first outer surface.

9. The membrane of claim 1, wherein the second surface comprises a plurality of pores in a skin layer; the plurality of pores having a closed perimeter in the skin layer; and wherein the second outer surface comprises a melt-fused skin layer from exposure to ultra-violet light.

10. A method of increasing the pore size in an outer surface of a membrane, the method comprising:
    providing a membrane having a first outer surface having a plurality of pores in a skin layer; the plurality of pores having a closed perimeter in the skin layer; and the membrane having a second outer surface and a porous supporting layer connecting the first outer surface to the second outer surface; and
    exposing the first outer surface to a pulsed ultra-violet flashlamp radiation, thereby generating a melt-fused skin layer, whereby the pores in the first surface are increased in size after exposure to the pulsed ultra-violet flashlamp radiation;

wherein the membrane, after exposing the first outer surface to the pulsed ultra-violet flashlamp radiation, has a throughput capacity expressed as a mass of filtrate weighed after 10 minutes of filtration, and wherein the throughput capacity is between about 100 to 1000 grams.

11. The method of claim 10, wherein the membranes first outer surface is made from a poly (arylene ether) such as polyethylene terephthalate, polyethylene naphthalate, polyethersulfone, or polysulfone.

12. The method of claim 11, wherein the first outer surface comprises polyethersulfone and an energy absorbed by the first outer surface is between about 45 to 440 mJ/cm$^2$.

13. The method of claim 10, wherein the pores have a pore diameter and the pore diameter is increased in size between about 10 to about 100 percent.

14. The method of claim 10, wherein the first outer surface has a surface porosity and the surface porosity is increased between about 20 to about 200 percent.

15. The method of claim 10, wherein the throughput capacity of the membrane is increased by at least 20 percent.

16. The method of claim 10, wherein the membrane has a log reduction of at least 7.

17. The method of claim 10, wherein a pulse duration for the pulsed ultra-violet flashlamp radiation is between about 2 to about 100 μs.

18. The method of claim 10, wherein a total energy output of a xenon flashlamp is between about 25 to 200 mJ/cm$^2$ per pulse.

* * * * *